A. H. KIRK.
AUTOMATIC CUT-OFF VALVE MECHANISM FOR GRAIN DAMPENERS.
APPLICATION FILED JULY 29, 1914.
1,121,846.
Patented Dec. 22, 1914.
2 SHEETS—SHEET 1.
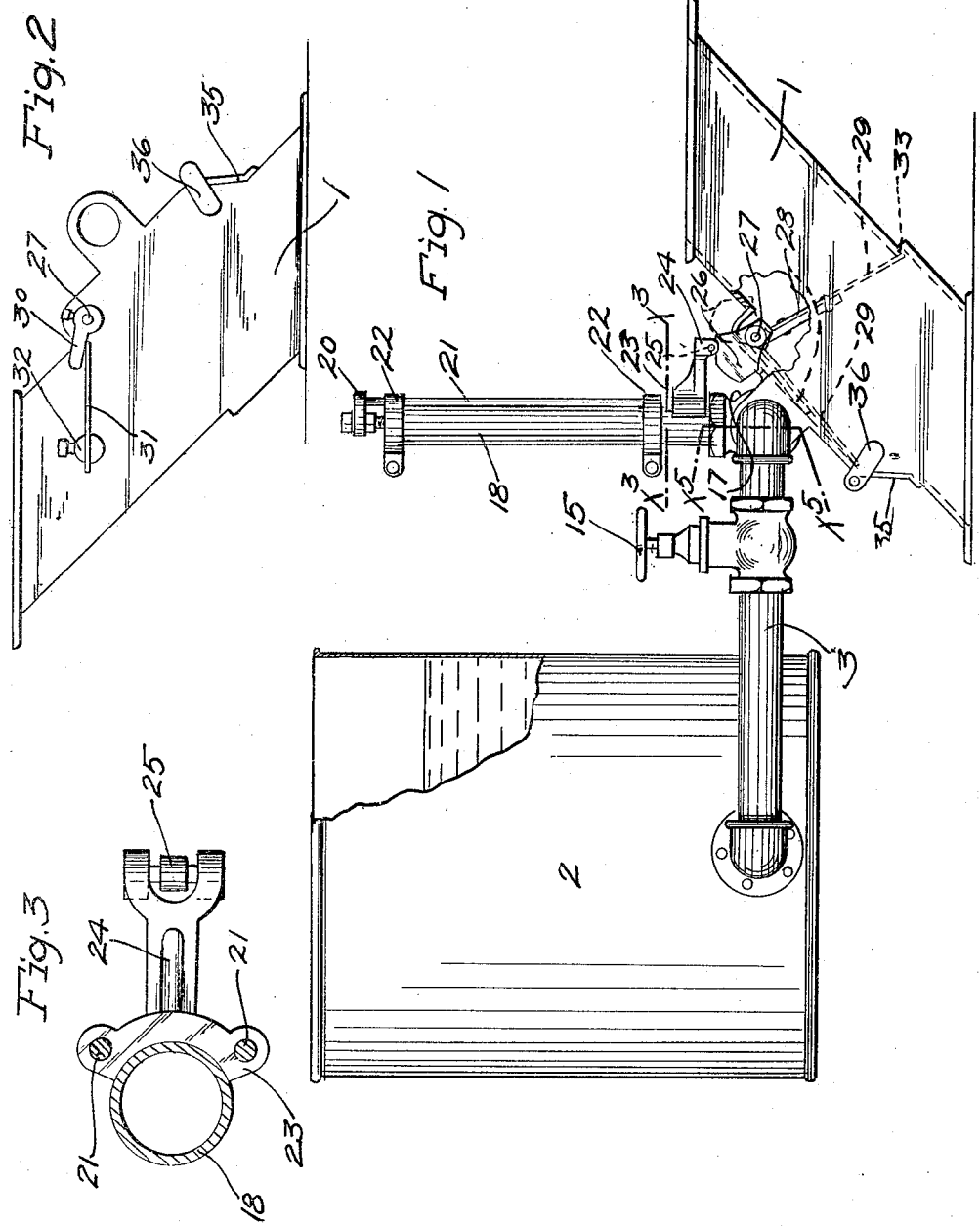
WITNESSES
E. C. Skinkle
A. H. Opsahl
INVENTOR
Alva H. Kirk
BY HIS ATTORNEYS
Williamson Merchant

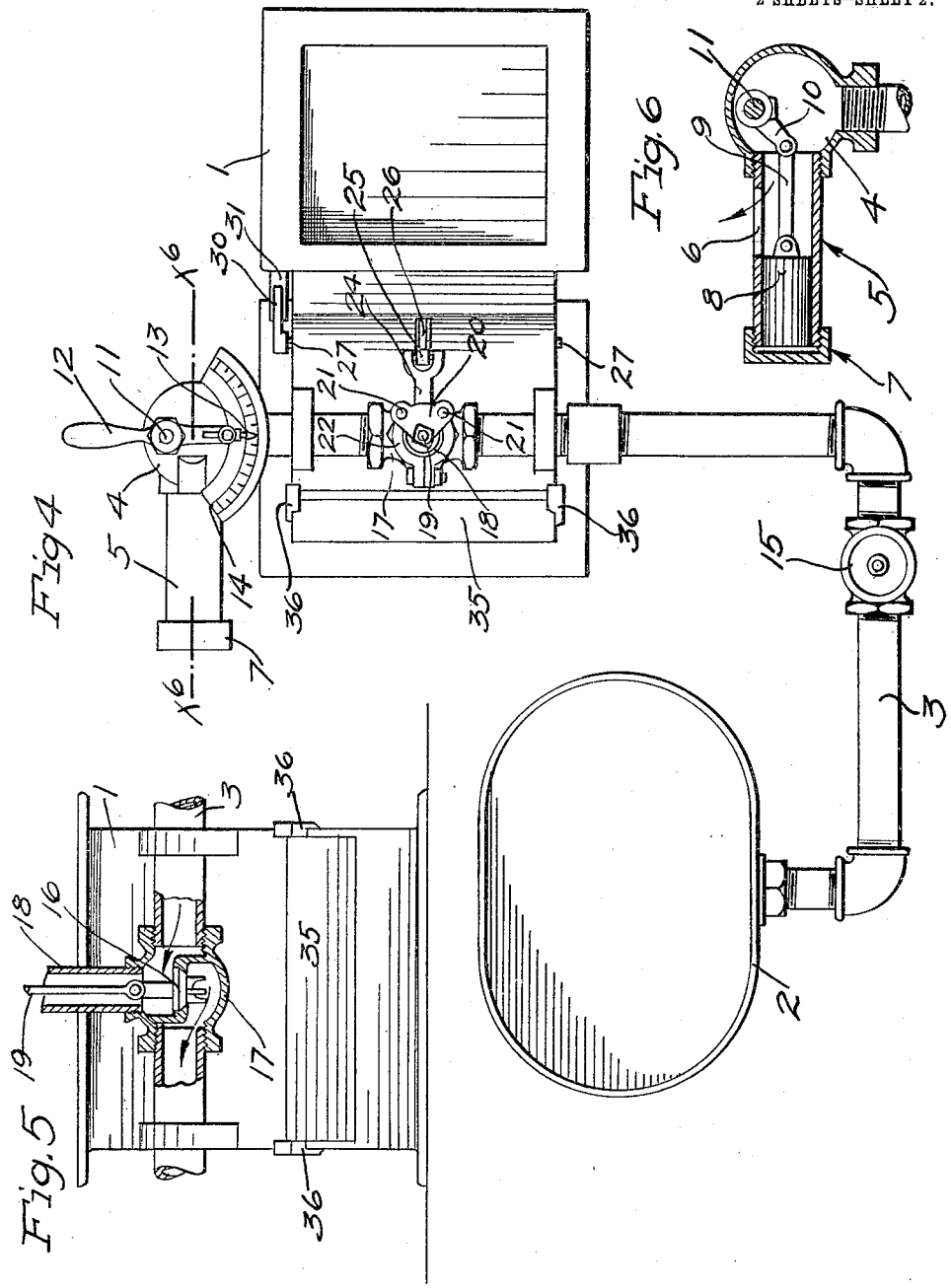

UNITED STATES PATENT OFFICE.

ALVA H. KIRK, OF MINNEAPOLIS, MINNESOTA.

AUTOMATIC CUT-OFF-VALVE MECHANISM FOR GRAIN-DAMPENERS.

1,121,846.

Specification of Letters Patent.  Patented Dec. 22, 1914.

Application filed July 29, 1914. Serial No. 853,991.

*To all whom it may concern:*

Be it known that I, ALVA H. KIRK, a citizen of the United States, residing at Minneapolis, in the county of Hennepin and State of Minnesota, have invented certain new and useful Improvements in Automatic Cut-Off Valve Mechanism for Grain-Dampeners; and I do hereby declare the following to be a full, clear, and exact description of the invention, such as will enable others skilled in the art to which it appertains to make and use the same.

Particularly, this invention relates to grain dampeners, and has for its object to provide an automatic cut-off valve mechanism whereby the supply of water to the material being dampened will be entirely cut off under two conditions, *i. e.*, when there is no supply of the material to be dampened, and when the runway or spout for conducting the material to be dampened, has been completely filled or clogged therewith.

The purpose of grain dampeners, as used in the milling art, is well known. Some types of grain dampeners automatically control the supply of water to the grain according to the variable flow or condition thereof, and others are adapted to be arbitrarily set for a predetermined discharge of the water onto the grain. An example of a highly efficient grain dampener of the first noted type, or, in other words, of the automatic type, is found in my prior Patent 881,135, of date, March 10, 1908. My improved automatic cut-off valve mechanism is well adapted for use in connection with the automatic controlling mechanism of the grain dampener of my said prior patent. However, in the accompanying drawings, it is shown as used in connection with a hand set valve mechanism for variably regulating the supply of water to the grain.

In the accompanying drawings which illustrate the invention, like characters indicate like parts throughout the several views.

Referring to the drawings: Figure 1 is a side elevation illustrating the application of my invention to the inclined spout of a grain dampener; Fig. 2 is an elevation of the inclined grain spout showing the opposite side from that shown in Fig. 1; Fig. 3 is a horizontal section taken on the line $x^3$ $x^3$ on Fig. 1; Fig. 4 is a plan view of the parts shown in Fig. 1; Fig. 5 shows a grain spout in elevation and with some parts sectioned on the line $x^5$ $x^5$ on Fig. 1; and Fig. 6 is a section taken on the line $x^6$ $x^6$ on Fig. 4.

The grain to be dampened is delivered from a suitable hopper, not shown, through an inclined spout 1.

The numeral 2 indicates an elevated water supply tank having a water delivery pipe 3 that is arranged to deliver water onto the grain to be dampened, after it has passed through the spout section 1. In graduating the supply of water delivered to the grain, the pipe 3 is, in the arrangement illustrated, connected by an elbow 4 to a cylindrical valve casing 5, which is provided with an elongated water discharge passage 6, and has its outer end closed by a cap 7. Working in the casing 5 is a piston valve 8 shown as connected by a link 9, to arms 10 of a short rock shaft 11 that is journaled in one wall of the elbow 4 and is provided at its outer end with a hand piece 12, and a pointer 13, which latter coöperates with a dial of a scale 14 secured on the exterior of the said elbow. As is evident, by setting the piston valve 8 in different positions, the water discharge orifice 6 may be closed or opened, more or less, so as to give a graduated predetermined supply of water to the grain. The water pipe 3 is also shown as provided with an ordinary globe valve 15, which valve is normally opened but may be closed to cut the water supply system entirely out of action.

The valve of my improved cut-off valve mechanism is applied in the water pipe 3 at a suitable point between the regulating valve and the water supply tank. This cut-off valve 16 (see particularly Fig. 5) normally closes a water passage formed in the web of a valve casing 17 that is interposed in the said water pipe 3 and, as shown, has an upwardly extended tube 18 secured thereto. The cut-off valve 16 is connected by a rod 19 that extends axially upward through the tube 18, and at its upper end is attached to a small cross head 20. The cross head 20, is, as shown, secured to the upper ends of a pair of upright rods 21 that are mounted to move through suitable bearings 22 on the tube 18. The lower ends of the rods 21 are connected to a head 23 which has a projecting arm 24, preferably provided at its free end with an anti-friction roller 25. This roller 25 is engageable with a cam plate 26 carried by the projecting shaft 27 of a valve actuating plate 29. The said shaft 27 is journaled in suitable bearings in the upper portions of the sides of the spout 1. One projecting end of the said shaft 27, (see Fig. 2) is provided with an arm 30 that is subject to a leaf spring 31 shown as secured to a stud 32 on the sides of the spout 1. This spring 31 exerts a yielding force which normally holds the actuating plate 29 in its spout closing position shown in full lines in Fig. 1, and against a stop shoulder 33 on the inclined bottom of the said spout.

Normally, as shown in Fig. 1, the raised portion of the cam 26 stands at the left of the roller 25, as viewed in Fig. 1, and the said cam, in that position, permits the cut-off valve 16 to remain in its closed position. When there is a flow of grain through the spout 1, the plate 29 will be caused to swing toward its extreme open position, and the raised portion of the cam 26, acting on the roller 25 will then raise the cut-off valve 16 into an open position so that water will then flow through the pipe 3, and its delivery to the grain will be regulated by the adjustment of the water regulating valve 8. Whenever the supply of grain to the spout 1 ceases, the plate 29 will be forced back to its closed position and the cut-off valve will be automatically closed. Also, with this construction, if the spout 1 should be filled up with grain and clogged, so that the flow of grain therethrough should be interrupted or stopped, the accumulated grain in the said spout will force the valve actuating plate 29 onward to its extreme open position indicated by dotted lines in Fig. 1; and this movement of the said plate 29 will cause the raised portion of the cam 26 to pass to the right of the roller 25 and thereby permit the cut-off valve 16 to be again lowered into its inclined position, so as to cut off the flow of water through the pipe 3, regardless of the adjustment of the water regulating valve 8. This latter feature is highly important because it prevents flooding of the grain when the spout is clogged and when the flow of grain from the spout into the bin is stopped. To prevent grain from being caught back of the valve actuating plate 29, as the same is moved to its extreme open position, as shown, a small gravity closed grain escape gate 35 which is pivotally supported at its upper edge by lugs 36 on the sides of the spout 1, is employed.

What I claim is:

1. In an apparatus of the kind described, the combination with a spout for the material to be dampened, of a water conduit for supplying water to such material, a valve in said conduit, a movable controller plate subject to the flow of the material being dampened, and connections between said controller plate and valve arranged to cause said valve to be closed in the two extreme positions of said plate and to be opened in intermediate positions of said plate.

2. In an apparatus of the kind described, the combination with a spout for the material to be dampened, of a water conduit for supplying water to such material, a valve under yielding strain to close said water conduit, a yieldingly mounted pivoted controller plate normally obstructing the flow of material on said spout, a valve actuating cam moved by said controller plate, and a cam engaging head movable with said valve, the said cam and head coöperating to open said valve in intermediate positions of said controller plate, but to permit the same to close in extreme positions thereof.

3. In an apparatus of the kind described, the combination with a spout for the material to be dampened, of a water conduit supplying the water to such material, a water regulating valve in said conduit for controlling the amount of water supply to the material, a normally closed cut-off valve also in said water conduit, a movable controller plate subject to the flow of material being dampened, and connections between said controller plate and said cut-off valve arranged to cause said valve to be closed in the two extreme positions of said plate and to be opened in an intermediate position of said plate.

4. In an apparatus of the kind described, the combination with an inclined spout for the material to be dampened, of a water conduit for supplying water to the material passed through said spout, a normally closed cut-off valve in said water conduit, a movable controller plate yieldingly held in a position to obstruct the flow of material through said spout, and connections between said controller plate and said cut-off valve, arranged to cause said valve to be closed in extreme open and extreme closed positions of said plate, and to be opened in intermediate positions of said plate.

5. In an apparatus of the kind described, the combination with an inclined spout for the material to be dampened, of a water conduit for supplying water to the material passed through said spout, a normally closed cut-off valve in said water conduit, a movable controller plate yieldingly held in a position to obstruct the flow of material through said spout, connections between said controller plate and said cut-off valve, arranged to cause said valve to be closed in extreme open and extreme closed positions of said plate, and to be opened in intermediate positions of said plate, and a yieldingly closed relief gate in the upper inclined wall of said spout whereby the material is prevented from lodging behind said plate when the latter is moved to an extreme open position.

6. In an apparatus of the kind described, the combination with a spout for the material to be dampened, of a water conduit for supplying water to the material passed through said spout, a water regulating valve in said water conduit, a normally closed cut-off valve also in said conduit, a pivoted controller plate yieldingly held in a closed position to obstruct the flow of material through said spout, a cam moved by said controller plate, and a cam actuated head connected to said cut-off valve, the said cam and head coöperating to open said cut-off valve when said controller plate is in an intermediate position, but permitting the same to be closed in extreme positions of said controller plate.

In testimony whereof I affix my signature in presence of two witnesses.

ALVA H. KIRK.

Witnesses:
HARRY D. KILGORE,
F. D. MERCHANT.

Copies of this patent may be obtained for five cents each, by addressing the "Commissioner of Patents, Washington, D. C."